United States Patent [19]
Brownscombe

[11] 3,877,556
[45] Apr. 15, 1975

[54] SILENT RATCHET

[76] Inventor: Philip J. Brownscombe, 1539 Long Hill Rd., Millington, N.J. 07946

[22] Filed: Sept. 28, 1973

[21] Appl. No.: 401,897

[52] U.S. Cl. .............................................. 192/45.1
[51] Int. Cl. ........................................... F16d 41/06
[58] Field of Search .................... 192/45.1; 188/82.8

[56] References Cited
UNITED STATES PATENTS

| 254,283 | 2/1882 | Dana | 192/45.1 |
|---|---|---|---|
| 1,912,407 | 6/1933 | Sahli | 192/45.1 X |
| 2,194,228 | 3/1940 | Jex | 192/45.1 |
| 3,235,046 | 2/1966 | Fulton | 192/45.1 |
| 3,236,345 | 2/1966 | Dietz | 192/45.1 |
| 3,345,093 | 10/1967 | Kimmel et al. | 192/45.1 X |

*Primary Examiner*—Allan D. Herrmann

[57] ABSTRACT

The toothless, noiseless ratchet to which the present invention is directed is a combination of pawl elements and springs positioned around a cam between the cam and the outer member, the pawls being spring biased into constant contact for instantaneous engagement and the pawls being divided into spaced-apart friction surfaces for contact with the outer member while these pawl friction surfaces conform to the inside curvature of the outer member thus providing large area contact between the pawl and outer member as well as between pawl and cam making possible lower compressive stresses and the employment of lower grade and accordingly less expensive metal with improved durability nevertheless and the plurality of pawls being symmetrically arranged around the cam to prevent the large radial locking forces from being transmitted to the bearings which would prevent easy release of the ratchet upon reversal of the driving direction as has been characteristic of prior devices, such prior devices with necessarily small-diameter cams and bearing being thereby further characterized by a smaller torque capacity and durability.

3 Claims, 7 Drawing Figures

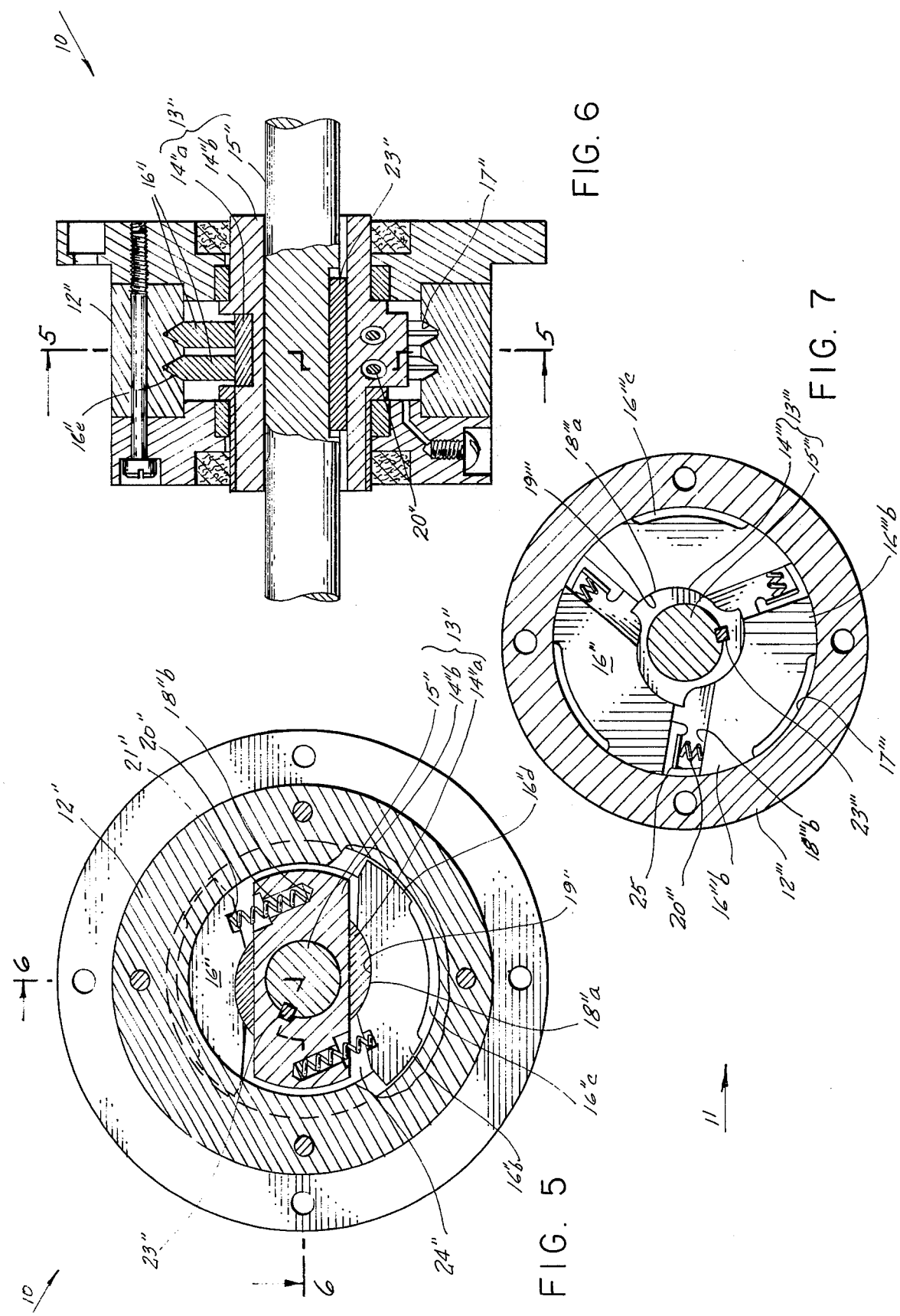

SILENT RATCHET

This invention relates to an improved silent ratchet.

BACKGROUND TO THE INVENTION

Basically there have previously existed toothed ratchets having noise preventing mechanisms therewith, and silent ratchets which are toothless which grip by frictional contact and are accordingly engageable at any position, serving to transmit rotary motion from one member to another in one direction only, the non-engaging direction being functionally devoid of large torque, but as is typically the case in U.S. Pat. No. 3,019,873, because of line contact in frictional engagement a high quality steel is required to withstand high compressive stresses in the order of 100,000 to 150,000 pounds per square inch because of the small area involved in the line contact; and because of the line contact high compressive stresses there often require a multiplicity of pawls. For typically single or multiple pawls, the stress on the cam as a result of one-sided pressure thereon and thereagainst by the pawl by forces transmitted through the pawl, at higher loads stresses on the cam bearings were destructive and/or wearing thereof unduly.

Silent toothless ratchets are manufactured and available in varying sizes for incorporation into products by manufacturers and generally are either of the roller ramp type in which rollers engage between a sloped surface on the inner member and an internal cylindrical surface of the outer member or they are of the sprag type in which oblong sprags with rounded ends engage into cylindrical surfaces, one external and the other internal, there being many variations of these simple ratchets or overruning clutches, or one-way clutches, as they are sometimes called. One variation is the single revolution clutch in which the rollers or sprags are normally kept out of engagement. By releasing the restraining member, engagement is effected until, after one revolution of the driven part, the rollers are disengaged.

A secondary disadvantage arising from the typical prior-art "line contact" characteristic is the resulting high degree of stress placed on the "line contact" during the frictional course of becoming and staying locked against rotation, this necessitating the employment of high-grade and conditioned steel at high cost therefore of production, lesser grade metal clearly being inadequate to endure such "line contact."

A shortcoming thereof is the limited torque which can be transmitted and the need therefore for multiple rollers or sprags to transmit adequate torque in a reasonable size.

Another shortcoming is that a small amount of wear occurring on the ramp or sprag surface is sufficient to cause the gripping action to become unreliable, this being particularly significant in view of the great tendency to wear frictionally by virtue of the line contact.

Another difficulty is that under severe stress, indentation and flattening of the parts where contact occurs can make disengagement difficult, the parts tending to lock together instead of freely releasing.

By reference to the typical above noted patent, the above noted problems and/or disadvantages of "line contact," unduly limited torque transmittable, slippage in the locked state, and release problems from the locked state may be more easily envisioned.

U.S. Pat. No. 157,997 characterizes another such prior silent ratchet which in FIG. 3 of that patent illustrates a view in which it may be seen that the large radial force which exists when transmitting torque in the locking direction is transmitted from the pawl to the cam and from the cam to the cam journal thereby contributing significant resistance to release from locking condition when the driving direction is reversed and also severely limiting the torque which can be transmitted. U.S. Pat. No. 531,577 illustrates pawls each continuing to have either inner or outer line contact, and not having area conforming contact on both inner and outer surfaces.

U.S. Pat. No. 2,760,614 has a pivotal V-shaped structure with a vertex-pivot contact-point of the V-structure, there being solely one leg in contact at any one time together with solely an outer-pawl line contact; accordingly expensive pawl metal of high quality still is required. U.S. Pat. No. 531,577 illustrates pawls each continuing to have outer line-contact, and not having area conforming contact on both inner and outer surfaces.

U.S. Pat. No. 3,345,093, relating to a non-friction driveshaft couplings, not to a ratchet, and is devoid of outer split (spaced-apart) pawl contact-surfaces.

SUMMARY OF THE INVENTION

Accordingly, objects of the present invention include the avoiding and/or overcoming of one or more of the difficulties and problems of the type noted above, together with new and desirable advantages being achieved.

More particularly, it is an object of the present invention to obtain a silent ratchet which is simple in construction.

Another specific object is to obtain a silent ratchet which does not require hardened parts.

Another object is to obtain a silent ratchet which has a large torque capacity for its size.

Another object is to obtain a silent ratchet which offers long life and is substantially insensitive in its functioning to wear.

Other objects become apparent from the preceeding and following disclosure.

One or more objects of the present invention are obtained by the invention as defined herein.

Broadly the invention includes a silent ratchet of the toothless variety dependent upon friction for its driving function, the improvements of the overall combination including the defining of pawl inner and outer friction surfaces which substantially precisely fit the respective outer member's inner preferably cylindrical friction surface and the cam member's outer arced surface substantially flushly face-to-face in both instances. The pawl outer engaging surface is arced relative to a normally centrally located cam center while the pawl's inner surface is arced around a point spaced from the cam's principal center resulting in eccentric pawl and cam surfaces, the outer and inner pawl contact surfaces being slidable along a line of continuous contacting surface — not merely a "line contact," which results in a greater torque transmitting ability as well as true seating irrespective of wear. Greater friction between pawl and housing is obtained in a preferred embodiment by virtue of the pawl outer slide surface being divided into two laterally extending Y-shaped legs. A further improvement results from making the surface of the pawl either convex, or concave as a groove, the outer member's inner surface being the other of convex or concave such that the respective surfaces slidably mate with one another thereby providing a wedging action and increased surface area for frictional contact and accordingly further increasing resistance to slipping in the driving direction between pawl and housing. An additional preferred feature is a cam means having slidably adjustable surfaces allowing the inner arc of the pawl to fit devoid of the need for precision tooling and/or machining thereof, because the sliding or slidable cam segment makes the cam segment fit the pawl inner arc even if the machining of the pawl was slightly off course. Furthermore the effects of wear are minimized because area contacting surfaces continue to retain area contact in spite of wear whereas "line contacting" surfaces wear to conform to each other and so destroy the line contact. Particularly this preferred embodiment is wear resistant because unequal wear on either the pawl contacting surfaces or the cam mating surfaces, or wear which causes an effective change in eccentricity results in a minute shifting of the cam sector to retain full seating and equalized pressure on contacting surfaces. Additionally, the relatively large area contact, particularly in the presence of a lubricating film which may completely separate the friction surfaces when overrunning at substantial speed, reduces the amount of wear.

Another preferred feature of the present invention is the allowable large diameter of the cam because of the greater friction possible by virtue of the Y-shaped pawl.

In still another preferred embodiment, the pawls are axially paired to even further increase the surface contact frictionally slidable, and similarly to further increase the total torque available from the single cam means. Additionally the pawls may be heavily spring biased into a gripping position thereby reducing any relative motion under load, such heavy biasing being undesirable in the "line contact" designs because of the increased wear along the line contact region. Also, by presence of the other recited structures and advantages thereof, the extent to which the inner arced surface of the pawl may be eccentric is possible to a greater degree because of the high degree of friction between pawl and housing which results from the spaced apart friction surfaces and, where used, from grooving of the pawl and/or housing surfaces as explained previously. The greater eccentricity results in a greater torque capability by virtue of the eccentricity per se and additionally because it permits a larger cam surface radius with increased bearing area between pawl and cam. In practice the cam radius is limited because the ratio of eccentricity to cam radius must be greater than the coefficient of friction between pawl and cam as otherwise the ratchet will not release freely when the direction of rotation is changed from drive to overrunning. A further advantage of the larger cam radius which my preferred embodiments permit is that a larger through shaft may be employed which widens the scope of application.

THE FIGURES

FIGS. 1, 3, 5, and 7 each disclose differing embodiments of the present invention substantially in cross sectional and/or elevation views.

FIGS. 2, 4, and 6 are views taken along sections of the respective FIGS. 1, 3, and 5.

DETAILED DESCRIPTION OF THE INVENTION

A ratchet of somewhat similar construction is shown in U.S. Pat. No. 157,997 by E. M. Krum, with the disadvantages noted above. This Krum construction was also considered by the writer prior to his discovery of the Krum patent, and the writer (inventor of this present invention) made a model and also the action was examined mathematically. The Krum design's principal fault is that it puts a large load on the eccentric internal bearing as well as on its outer bearing surface. This offers added resistance to release and it is necessary to make the cam inner and outer diameters very small if the ratchet is to be self releasing. This in turn, the small radii, limits the torque capacity of the Krum assembly.

Figure 1:
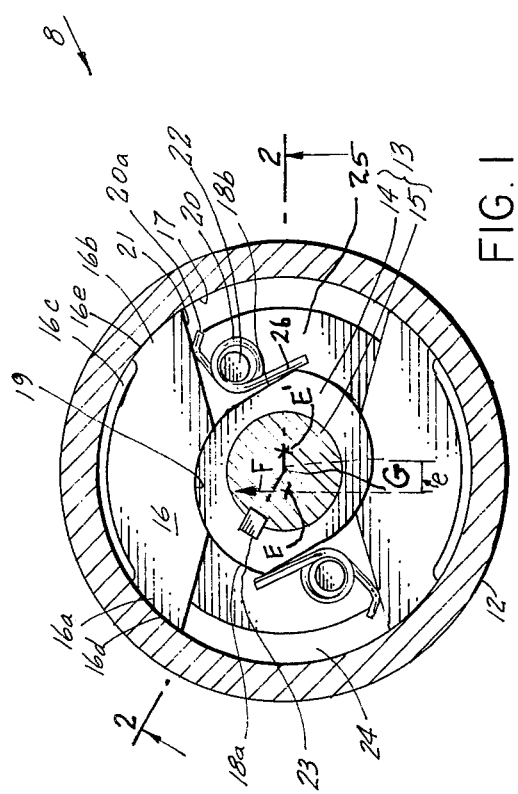
Figure 3:
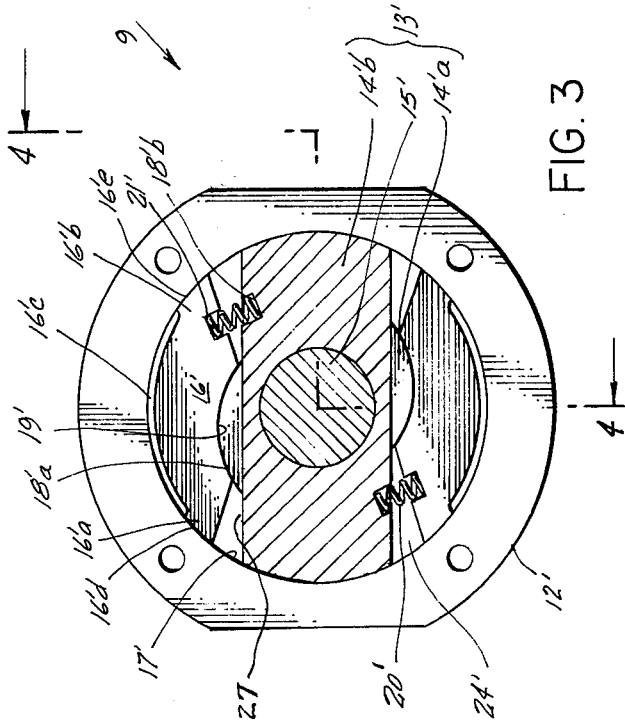

In my design embodiments of FIGS. 1, 3 and 5, the above noted shortcomings are avoided by making a symmetrical construction which in effect amounts to two pawls and two eccentrics so placed that the radial loads being equal and oppositely placed, no load between the housing and shaft results (or if made in the Krum construction, between eccentric member and the shaft thereof).

It is also possible to make a symmetrical construction with three (or more) pawls bearing on a cam having a like number of eccentric surfaces. See FIG. 7.

In a preferred construction (embodiment) shown in FIG. 1, a further improvement is made by constructing the pawls to bear against the housing in two spaced areas, areas 16a and 16b. The effect of this is to increase the total radial force of surfaces 16e, 16d against the housing 12 surface 17 beyond the magnitude of the force (F) bearing against cam surface 18a. This permits the eccentricity to be greater and therefore in turn the cam diameter to be larger and still have positive gripping at the housing surface 17 with self releasing from the cam surface 18a. The advantages are that the greater eccentricity and the larger cam surface which provides a larger bearing area, result in increased torque capacity and permit a larger shaft diameter.

Another design feature is incorporated in the clutch of FIGS. 5 and 6. This is similar in principle to the FIG. 3 embodiment, except that the outer surface 16'e of the pawls (two pairs are shown but are not essential to the principle) are tapered which gives a wedging action similar to that of a cone clutch whereby the torque resistance for a given engaging force is appreciably increased. In the proportions shown the torque resistance is increased about 75% with no risk of sticking. Advantageous, paired tapered wedges of reduced radius embody a total frictional surface area equivalent to a single wedge of excessively large radius.

The benefits of this construction may be used to increase the range of friction coefficient under which the clutch will operate satisfactorily, or to employ a larger cam radius and increased eccentricity, or a combination of these. The larger cam radius and eccentricity increase torque capacity for a given outside diameter and permit a larger shaft to be used. In these respects, the tapered surfaces provide the same advantages as spaced sections 16a and 16b previously described.

A significant design feature of my ratchet is that the axis of the pawl 16 is at or nearly at right angles to the line joining the center of rotation of the pawl to the housing axis. In FIG. 1, the pawl radius extends upwardly from point E at 90° to a line between points E and G. Therefore when cam 13 is rotated clockwise slightly relative to housing 12 and pawl 16, the effect is to raise pawl 16 vertically thereby causing an equal interference or compression of surfaces over the entire bearing area. Thus the center of pressure remains fixed and pressure is distributed evenly over the entire contacting pawl surfaces 16d and 16e.

When this condition does not exist, for example in sprag or roller clutches of the prior art types, torque application causes the pawls (sprags or rollers) to rotate and line contact is required as otherwise the center of pressure would change radically and end up at one edge of the pawl surface. For example, in the ratchet of Teal U.S. Pat. No. 531,577, the pawls are pivoted in sockets either on the inner member (FIG. 2 of Teal) or the outer member (FIG. 3 of Teal). Suppose the outer ends of these pawls (FIG. 2 of Teal) were made to conform to the housing surface. Then as the center member rotates slightly under load to put a compressive stress in the pawls thereby resisting further rotation, the pawls (of Teal) are caused to rotate in their sockets, thereby putting all the load on the very edge of the engaging surface $f$ of Teal where the spring is attached and the surface of Teal would no longer conform to the housing. For this reason, the surface $f$ of Teal is not designed to conform and only line contact with the housing of Teal exists.

Another very desirable feature is incorporated in the embodiment shown in FIG. 3 of this inventor's disclosure. Here the cam 13' is not one solid piece. There are two moon like pieces 14'a having each a cylindrical outer surface 18'a, and a flat or linear slide surface on the other (inner) side. The principal advantage here is that the cam pieces are self centering and locate themselves to suit the eccentricity of the inner pawl surfaces 19'. This avoids the necessity for great precision in matching the eccentricities of the cam 13' and the pawl 16', which matching is necessary in the FIG. 1 embodiment as between the cam 14 and pawl 16 thereof. There may be a manufacturing advantage too in this construction.

Figure 2:
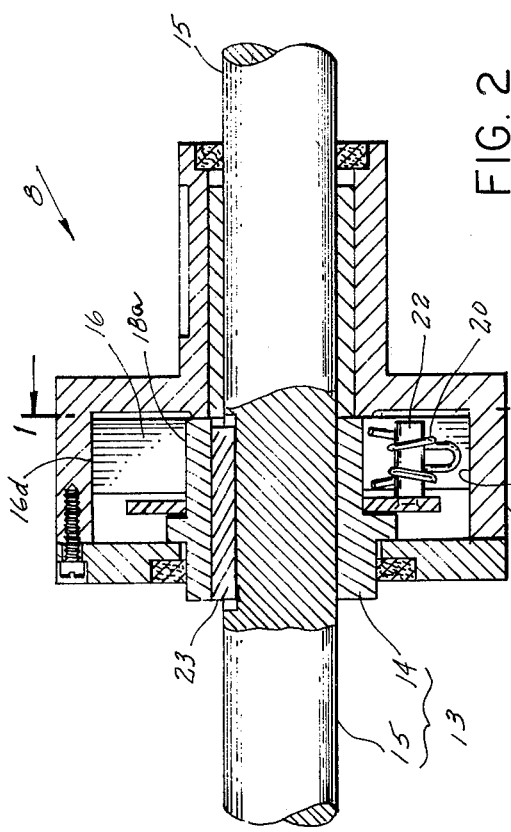

A cross section of one embodiment of the invention is shown in FIG. 1, as taken along lines 1—1 of FIG. 2. It consists of four basic parts; an external housing 12, a central cam 14, a pair of pawls 16, lightly pressed into engagement by springs 20. The cam may be integral with or keyed to, as shown, a central shaft. Either the shaft or the housing may be the driving member. Preferably the pawls each contact the housing at two separated pawl surfaces 16d and 16e of separated portions 16a and 16b separated by a recessed interconnecting intermediate cam portion therebetween defining space 16c. The surface 19 of pawl 16, this surface being the pawl surface closest to the axis, is also cylindrical and fits a like but convex surface 18a of cam 14, the center of this cylindrical surface being at E and for the lower pawl at E' offset slightly from common shaft and housing (12) center G. Therefore pawl 16 moves relative to cam 14 as if it were pivoted at point E. The opposite pawls of FIG. 1 are fitted in identical manner with their centers of rotation, relative to cam 14, at E and E' respectively, offset from center G; E and E' being offset a like amount substantially, from center G but being offset in different directions, in opposite directions in this FIG. 1 embodiment.

Action of a clutch may be visualized by imagining housing 12 held stationary with torque applied to the shaft in a clockwise direction, resulting (as the shaft initially rotates a very small amount) in radially outwardly lifting of pawls 16 vertically (as discussed above) away from center G until both pawl surfaces 16d and 16e press against housing 12 inner surface 17 with sufficient force to oppose the applied torque. Slipping of pawl surfaces 16d and 16e on housing 12 surface 17 is prevented because proportions are such that the resisting torque due to friction is greater than the applied torque under all conditions.

When applied torque is released, the radial force F acting at the eccentric pawl portions identified as the cam surfaces 18a results (due to friction) in a torque which resists disengagement. Principally because cam radius ($r$) is substantially less than housing 12 radius (R), this resisting torque is always less than the disengaging torque which torque is due to radial force F acting through eccentric distance $e$. Therefore this clutch locks solidly in one direction but releases freely in the other direction of rotation.

It may be shown mathematically and the inventor has in fact demonstrated in actual practice by model that the proportions as shown and illustrated in FIG. 1 result in such action and make a practicable efficient machine element.

Separation of surfaces 16d and 16e while not essential to successful operation of the invention is a substantial and preferred improvement, a principal advantage of such separation being that a given force F between cam and pawl produces a larger (than F) sum of the two radial forces between surfaces 16d, 16e and the housing, thereby permitting larger eccentricity $e$ (and accordingly larger radius $r$ of the cam) to be used than is possible without such separation, and still have reliable releasing action. This in turn makes room for an adequate shaft (i.e., a larger diameter shaft) within the cam outline.

Note that wear on surfaces 16d and 16e or the cam-engaging surfaces 19 makes a slight looseness which is self correcting because a slight rotation of cam 13 raises center E to reeffect complete engagement. For a like reason, the pawl height is not critical (height of pawl 16 being along the line of radius thereof to point E) because near perfect fitting can be obtained even with moderate variations therein.

Because my designs employ engagement of relatively large pawl areas rather than mere line contact, they are capable of handling larger torque in a compact (smaller than conventional size) unit and this is possible without resorting to hardened surfaces of the cam, pawl, and/or housing, although hardened material such as conditioned steel may be employed if desired.

A design variation shown in FIG. 3 operates in the same manner as discussed above for other embodiments. The difference here is that cam surfaces 18'a are on pieces 14'a separate from the central body 14'b and pieces 14'a can slide on the flat surfaces of member 14'b in a direction which permits these pieces 14'a to be located by the internal pawl surfaces 19'. This requires less accuracy in manufacture of the pawls 16' because relative location of internal and external surfaces of pawl 16' is not critical.

FIG. 2 shows a longitudinal in-part sectional view of the device as taken along lines 2—2 of FIG. 1. Housing, bearings, shaft and oil seals are apparent. Springs 20 which keep pawls 16 in engagement may be of any suitable form such as helical, coil, or leaf, the requirement being that they act to rotate the pawls relative to the cam about point E causing engagement with the housing to insure locking and to prevent backlash and at the same time engaging with the cam surface. In FIGS. 1 and 2, the springs are shown as wire torsion springs 20 located by pins 22 mounted on a washer shaped plate 25. Compression coil springs 20' have also been used successfully, as shown in FIG. 3, for example.

Figure 4:
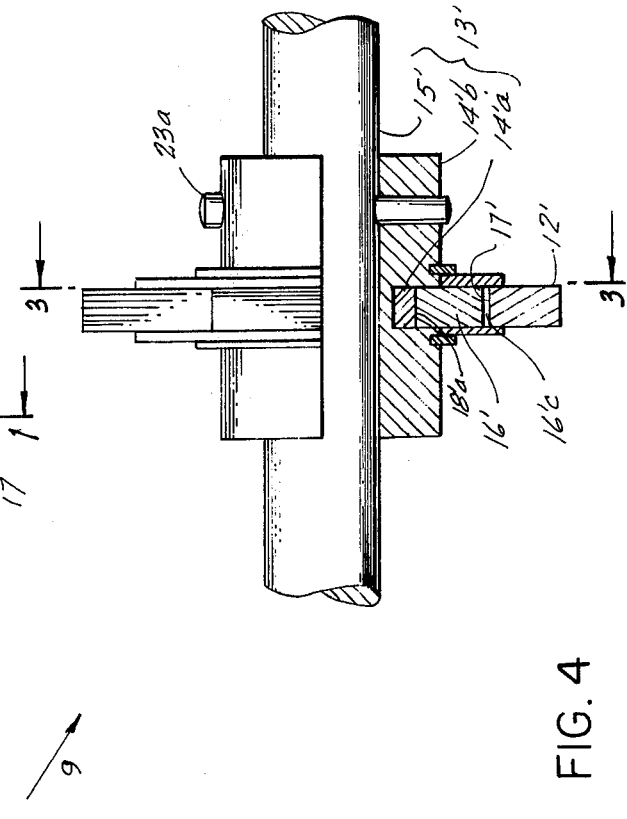

Accordingly FIGS. 1 and 2 illustrate one embodiment, FIGS. 3 and 4 illustrate another embodiment, FIGS. 5 and 6 illustrate another embodiment, and FIG. 7 illustrates still another embodiment, the common parts thereof being commonly identified by the same basic numerals such as 16, 16', 16'', 16''' for example. FIG. 2 is taken along lines 2—2 of FIG. 1, with FIG. 1 being taken along line 1—1 of FIG. 2, and FIG. 4 is taken along line 4—4 of FIG. 3 with FIG. 3 being taken along line 3—3 of FIG. 4, and similarly FIG. 6 is taken along lines 6—6 of FIG. 5 with FIG. 5 taken along line 5—5 of FIG. 6, and the FIG. 7 embodiment being a view analogous to those of FIGS. 1, 3, and 5 for those embodiments. In FIGS. 1 and 2, the cam portion 13 includes the shaft portion 15 and the cam element 14 mounted thereon and there around having locking key 23 and defining a space 24 between outer cam surface 18a and inner surface 17 of outer member 12, leg 26 of spring 20 biasing against flattened surface 18b of cam element 14; the arc of inner surface 19 of pawl 16 and of outer surface 18a each respectively being arced around common center point E which point E is offset from center point G of the common arcs of outer member 12 surface 17 and pawl 16 outer surfaces 16d and 16e of spaced apart portions 16a and 16b defining therebetween space 16c; the other leg 20a is biased against the abutment surface 21 of pawl 16, with the spring 20 mounted on pin 22 of washer like structure 25.

In the embodiment of FIGS. 3, and 4, and also of FIGS. 5 and 6, the cam element is subdivided into the main element 14'b pinned to the shaft 15' by pin 23a (FIG. 4) and opposite segment or moon type parts 14'a which each include the cam convex surface 18'a and an inner linear surface slidable along linear surface 27 on each of opposite sides of the cam element 14'b. Note also that the cam element 14'b supportingly extends and slidably flushly rotates to and within the outer member 12' inner surface 17'. Spring 20 is biased between the pawl 16' and the cam element 14'b.

Embodiment of FIGS. 5 and 6 differs in view 5 in the cam element 14''b being spaced from the outer member 12'' inner surface, and as illustrated in FIG. 6, there are provided paired side-by-side spaced apart pawls on and slidably in contact with common cam portion 14''a. Also the respective ones of the paired pawls each have, as illustrated in FIG. 6, converging walls substantially to but not entirely to a point, the converged walls ending in a blunted portion which prevents the possibility of line contact initially and/or after wear of the converging surfaces 16''e; accordingly the outer member 12'' includes v-shaped grooves walls 17'' seatable of each respectively of the pawls and their respective converging surfaces.

The FIG. 7 embodiment corresponds substantially to that of FIGS. 1 and 2, except for having multiple pawls in excess of two, symmetrically spaced around the cam.

It is within the spirit and scope of the present invention to make such modifications, variations, and substitutions of equivalents as would be apparent to a person skilled in this particular field of art.

I claim:

1. A silent ratchet device comprising in combination: a first structure having an inner periphery defining in a first plane a circular space; cam means mounted concentrically within said space and having spaced-apart radially-outwardly-projecting first circumscribing-convex-surfaces, the first convex-surfaces extending along different sectors of the circular space in common directions around a substantially common point substantially centrally of the cam means; at least one of said first structure and said cam means being pivotably-rotatably concentrically mounted relative to the other in a plane substantially parallel to said first plane; eccentric pawl means mounted slidably within said space between and movably slidable-along each of said first surfaces of said cam means and said first structure's inner periphery, mounted slidably substantially along said first plane, and having a plurality of angularly spaced-apart eccentric pawl portions, for each said radially projecting circumscribing convex-surface there being a matchingly positioned pawl portion of the pawl means, each pawl portion having a radially-outwardly-facing periphery defining a second convex-surface of a radius substantially identical to that of the circular-space-defining first structure's inner periphery, and each pawl portion having a radially-inwardly-facing periphery defining a concave-surface of a radius substantially identical to that of said first convex surface, the arc of said concave-surface being eccentric to the arc of said second convex-surface and the arcs of said first convex-surfaces having centers respectively off-set from said cam means center such that with regard to potential rotary movement of one relative to the other of the first structure and the cam means, the pawl portions acting coordinately offset pressures of one-another while concurrently braking against rotation in one of clockwise and counter-clockwise rotation and permitting rotation in the other of clockwise and counter-clockwise rotation; and spring means mounted on one of said eccentric pawl means and said cam means, and the spring means being biased-against said pawl means such that each said pawl portion is biased in an engaging-direction and such that the biased-pawl portion is spring-biased into friction-contact with each of said inner periphery of said first structure and said first surface of said cam means, the pawl portions being separate from one-another, each said second convex-surface of each pawl portion including two spaced-apart radially-outwardly-facing contact surfaces; and an intermediate cam portion and at-least two separate spaced-apart cam portions located along different circumscribing surfaces of the intermediate cam portion, and different ones of said first convex surfaces of the cam means being respectively outer convex surfaces of the spaced-apart cam portions and each spaced-apart cam portion including a lineally-extending slide-surface and the intermediate cam portion including lineally-extending slide-surfaces, there being one cam-portion lineally-extending slide surface matched with each spaced-apart cam-portion lineally-extending slide-surface, such that each spaced-apart cam portion is slidable to and fro for proper flush alignment of its outwardly-facing first convex-surface with aligning movement to the pawl portion matched therewith.

2. A silent ratchet device of claim 1, in which each pawl-portion includes structure which defines converging contact-surfaces which in cross-section narrow in a radially-outwardly-extending direction, and in which said inner periphery of said first structure defines groove structure for and slidably receivably-seatable of each of said converging-contact-surfaces structures.

3. A silent ratchet device of claim 2, including axially-spaced-apart side-by-side-paired ones of said pawl portions.

* * * * *